July 14, 1936.  R. D. HILL  2,047,266

FILTER

Filed Sept. 17, 1935

Inventor
Rolo D. Hill
by Hazard and Miller
Attorneys.

Patented July 14, 1936

2,047,266

UNITED STATES PATENT OFFICE 2,047,266

FILTER

Rolo D. Hill, Los Angeles, Calif., assignor of one-half to Guy S. Tucker, Los Angeles, Calif.

Application September 17, 1935, Serial No. 40,880

6 Claims. (Cl. 210—165)

My invention relates to an oil filter for motor vehicles, in which the oil from the crank case of the engine is pumped through the filter to remove carbon particles and other sediment.

It is an object of this invention to provide an efficient oil filter having a glass container through which the functioning of the filter may be observed at all times. A so-called cartridge is removably mounted in the container and provided with a sediment chamber and filtering means so constructed that the entire filtering surface is used at all times, irrespective of the amount of sediment collected therein. A common type of oil filter for automobile engine has its filtering efficiency impaired as the sediment is increased. In the present construction the filter cloth embraces the sediment chamber and receives the oil to be filtered from the upper portion only of said chamber.

Another object of the invention is to provide an even flow of the oil to be filtered by means of an air cushion in the container.

With the above and other objects in view which will appear as the description proceeds, my invention consists in the construction and combination of parts hereinafter described and claimed. In the accompanying drawing which forms a part of the specification I have illustrated the preferred embodiment of my invention, and in which, Fig. 1 is a vertical central section through my filter.

Figure 1:
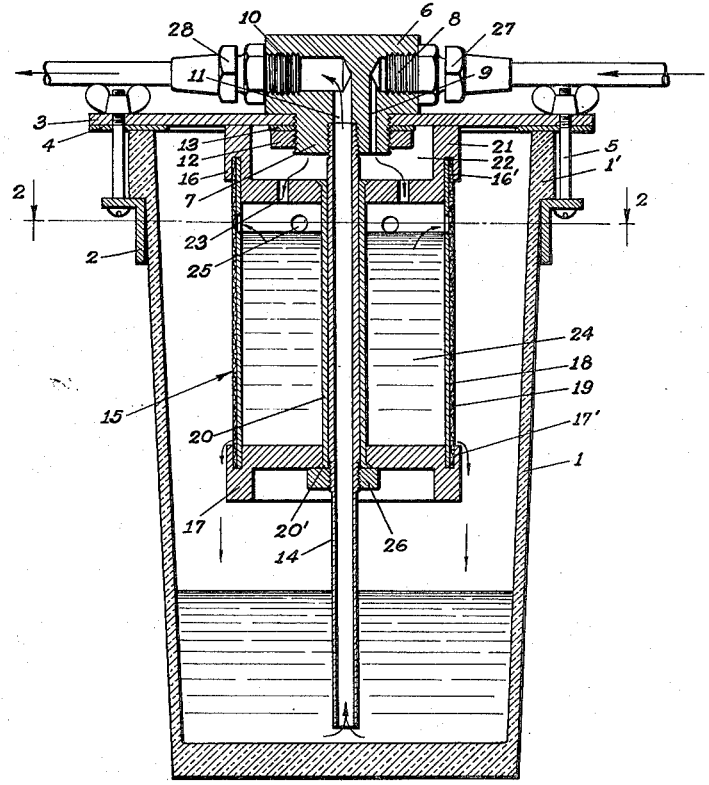
Figure 2:
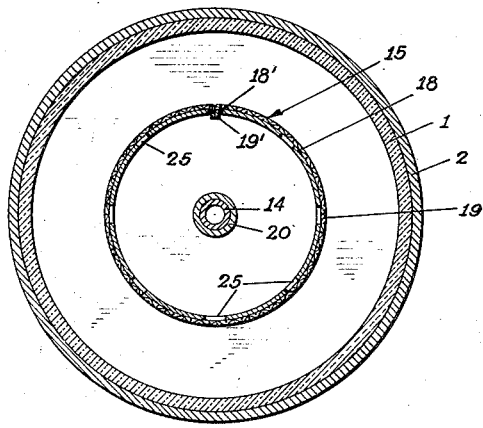
Fig. 2 is a horizontal section taken on the lines 2—2 of Fig. 1.

Referring to the drawing, I indicates a container preferably made of glass. It is preferably made slightly tapering towards the bottom and is provided at its upper part with an annular shoulder 1' which is engaged by a cover plate holding ring 2. The cover plate 3 forms with a gasket 4 an air-tight closure for the container 1 and is clamped in position by means of clamping bolts 5 connecting the holding ring 2 with the cover plate 3.

A head 6 provided with a nipple 7 is screw threaded centrally of the cover plate 3. The head 6 is provided with an oil inlet duct 8 leading to an inlet port 9 in the nipple 7 and an oil outlet port 10 which leads to a screw threaded port 11 in the nipple 7. It should be noted that the port 11 is located centrally in the nipple 7 while the inlet port 9 is located eccentrically thereof. A nut 12 screw threaded on the nipple 7 forms with the gasket 13 an air-tight connection between the head 6 and the chamber and also locks the head 6 securely in place.

A vertical oil outlet pipe 14 is threaded in the port 11 of the nipple 7 and extends downwardly into the lower end of the container 1. The cartridge indicated as a unit 15 is removably mounted on the outlet oil pipe 14. It consists of a top 16 and a bottom 17 between which a tubular metal cylinder 18 is mounted. The metal cylinder 18 is provided with a vertical slit 18' for the reception of the lateral edges of a filter cloth 19 embracing the cylinder 18. The resiliency of the cylinder 18 permits the slit 18' to be spread apart so that the lateral edges 19' of the filter cloth may be inserted in the slit and securely held in position. The cylinder 18 with the filter cloth 19 mounted thereon externally is secured to the tops 16 and 17 respectively, by inserting the ends of the cylinder 18 and the filter cloth 19 in corresponding annular channels 16' and 17' in the top 16 and the bottom 17. The top 16, the bottom 17 and the cylinder 18 form a sediment chamber 24. An open ended tube 20 of a size to fit snugly upon the oil outlet pipe 14 is positioned centrally through the top 16 and bottom 17, the ends of the tube 20 being slightly upset as indicated at 20' so as to lock the top and bottom, and the cylinder 18 with its filter cloth 19 securely together.

The top 16 is provided with an upstanding flange 21, the top of which engages the underface of the cover plate 3 and forms therewith an oil distributing chamber 22. A plurality of perforations 23 in the top 16 conduct oil into the sediment chamber 24. It should be noted that none of the perforations 23 are in vertical alignment with the oil inlet port 9 for a purpose hereinafter described. In the upper end of the cylinder 18 a plurality of oil outlet ports 25 are provided. A lock nut 26 screw threaded on the pipe 14 holds the cartridge 15 in position.

*Operation.*—Oil enters the filter by means of a screw connection 27 communicating with the oil inlet duct 8 and passes through the port 9 into the oil distributing chamber 22, which port 9 as stated before, is not in vertical alignment with perforations 23 leading to the sediment chamber 24; the object being to cause the oil to flow without pulsation into the sediment chamber 24. The oil on reaching the chamber 24 will fill the same until it overflows through perforations 25; particles of carbon and other sediment tending to settle in the bottom of the sediment chamber 24 so that relatively clean oil passes through perforations 25 between the narrow space formed between the filter cloth 19 and the cylinder 18.

Figure 3:
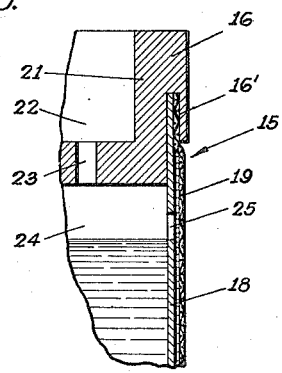
Fig. 3 is an enlarged sectional view showing the position of the filter cloth during the operation of filtering.

In Fig. 3 is illustrated what takes place in the filtration of the oil. The filter cloth 19 offers resistance to the passage of the oil therethrough. This resistance causes the oil to form a liquid sleeve between the outside of the cylinder 18 and the inside of the filter cloth 19 as illustrated in Fig. 3. In this manner substantially the entire filter cloth is utilized, irrespective of the accumulation of sediment within the sediment chamber 24. The filtered oil will flow from the outer surface of the filter cloth 19 and drop to the bottom of the container 1 and accumulate therein. Owing to the fact that the closure plate 3 and the head 6 form a hermetical seal for the container 1, the air entrapped in container 1 will be compressed so that the compressed air in container 1 will form an elastic cushion, evenly forcing the oil through oil outlet pipe 14 through the outlet duct 10 in the head and through a screw threaded connection 28 in its passage to the crank case of the engine.

When it is desired to replace the cartridge 15, clamping bolts 5 are loosened and the container 1 is removed. By removing the lock nut 26 the cartridge 15 may be slipped downwardly and off the pipes 14 and a new cartridge 15 may be mounted in its place.

Various changes in the construction and arrangement of parts may be made by those skilled in the art without departing from the spirit of my invention as claimed.

I claim:

1. An oil filter, comprising a glass container, a removable cover plate therefor, means for clamping the cover plate on the top of the container, a cartridge removably mounted and extending downwardly from the cover plate into the container, said cartridge comprising a cylindrical sediment chamber having a top and bottom and a side wall, said side wall comprising a resilient tube having a vertical slit and provided with perforations in its upper end, a filter cloth embracing the slit tube and having its lateral edges clamped in the slit, the top of said cartridge being provided with an upturned flange to form an oil distributing chamber and provided with one or more perforations leading to the sediment chamber, a head mounted on the cover plate and provided with an oil inlet duct and an oil outlet duct, said oil inlet duct communicating with the oil distributing chamber and being out of vertical alignment with the perforations in the top of the sediment chamber, an oil outlet pipe connected to the oil outlet duct in the head and extending downwardly through the bottom and top of the sediment chamber to the lower part of the container, and locking means holding the cartridge on the oil outlet pipe against the cover plate.

2. An oil filter comprising a glass container, a removable cover forming a hermetic seal therefor, a cartridge removably mounted and extending downwardly from the cover into the container, said cartridge comprising a sediment chamber having a top and bottom and a side wall, said sediment chamber being imperforate except at its upper portion, there being a series of openings in the upper portion of the said side wall, a filter cloth embracing the side wall, the top of said cartridge being provided with an upturned flange to form an oil distributing chamber and provided with one or more perforations leading to the sediment chamber, a head mounted on the cover and provided with an oil inlet duct and an oil outlet duct, said oil inlet duct communicating with the oil distributing chamber, an imperforate oil outlet pipe connected to the oil outlet duct in the head and extending downwardly through the top and bottom of the sediment chamber to the lower part of the container, and means for locking the cartridge against the cover.

3. An oil filter comprising a container, a removable cover forming a hermetic seal therefor, a cartridge removably mounted and extending downwardly from the cover into the container, said cartridge comprising a sediment chamber having a top and a bottom and a side wall, said sediment chamber being imperforate except at its upper portion, there being a series of openings in the upper portion of said side wall, a filter cloth embracing the side wall, the top of said cartridge forming with the cover an oil distributing chamber and provided with one or more perforations leading to the sediment chamber, an oil inlet duct passing through the cover and communicating with the oil distributing chamber, an oil outlet duct passing through the cover, an imperforate oil outlet pipe connected to the oil outlet duct and extending downwardly through the top and the bottom of the sediment chamber to the lower part of the container, and means for locking the cartridge against the cover.

4. An oil filter, comprising a container, a removable cover forming a hermetic seal therefor, a cartridge removably mounted and extending downwardly from the cover into the container, said cartridge comprising a cylindrical sediment chamber having a top and a bottom and a side wall, said sediment chamber being imperforate except at its upper portion, there being a series of openings in the upper portion of said side wall, a filter cloth embracing the side wall, an oil distributing chamber on the top of the cartridge and provided with one or more perforations leading to the sediment chamber, an oil inlet duct passing through the cover and communicating with the oil distributing chamber, an oil outlet duct passing through the cover, an imperforate oil outlet pipe connected to the oil outlet duct and passing through the cartridge to the lower part of the container, and means for locking the cartridge on the oil outlet pipe.

5. An oil filter, comprising a container, a removable cover forming a hermetic seal therefor, a cartridge removably connected to the cover and extending downwardly into the container, said cartridge comprising a cylindrical sediment chamber having a top, a bottom and a side wall, said sediment chamber being imperforate except at its upper portion, there being a series of openings in the upper portion of said side wall, a filter cloth embracing the side wall, an oil distributing chamber on the top of the cartridge and having one or more perforations communicating with the sediment chamber, an oil inlet duct passing through the cover and leading into the oil distributing chamber, an oil outlet duct passing through the cover, an imperforate oil outlet pipe connected thereto and extending downwardly to the lower part of the container, and means for locking the cartridge in position.

6. An oil filter, comprising a container, a removable cover forming a hermetic seal therefor, a cartridge removably mounted and extending downwardly from the cover into the container, said cartridge comprising a sediment chamber having a top, a bottom and a side wall, said sediment chamber being imperforate except at its upper portion, there being a series of openings in the upper portion of said side wall, a filter cloth embracing the side wall, an oil inlet duct passing through the cover and communicating with the sediment chamber, an oil outlet duct passing through the cover, an imperforate pipe connected thereto and extending to the lower part of the container, and means for locking the cartridge in position.

ROLO D. HILL.